Aug. 10, 1926. 1,595,321
W. F. STIMPSON
COUNTER SCALE
Original Filed July 20, 1921    2 Sheets-Sheet 1
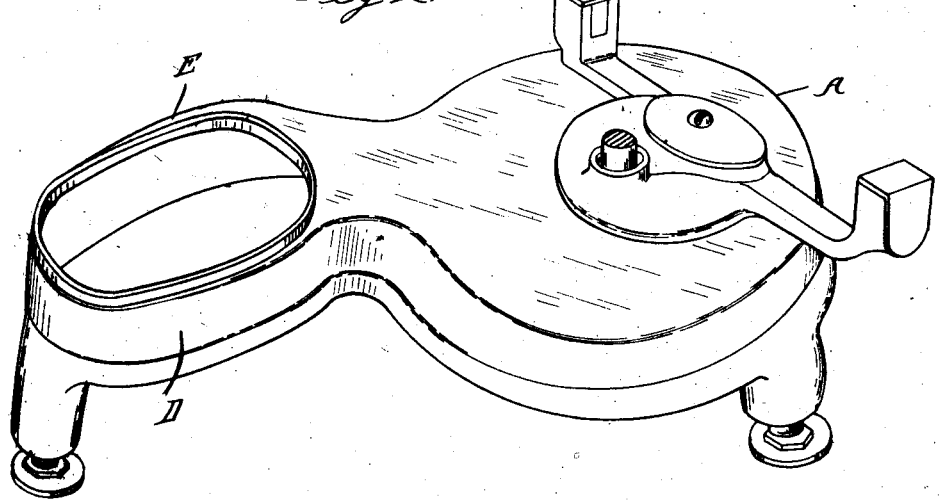
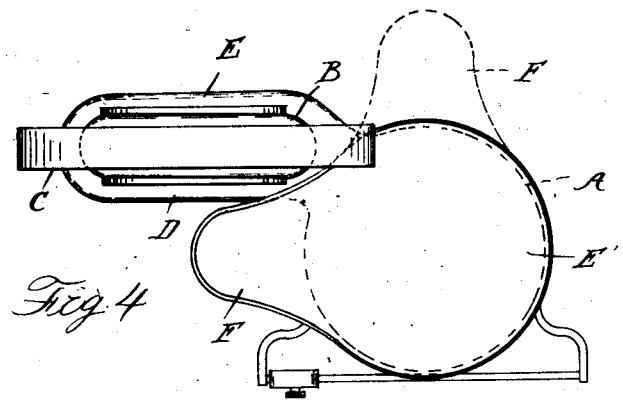
Inventor
Walter F. Stimpson Aug. 10, 1926.  
W. F. STIMPSON  
COUNTER SCALE  
Original Filed July 20, 1921    2 Sheets-Sheet 2
1,595,321
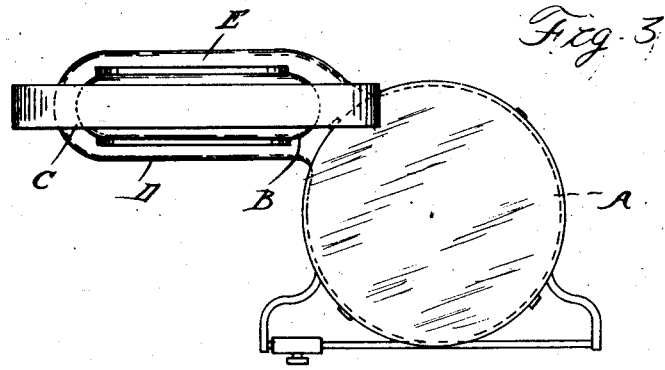
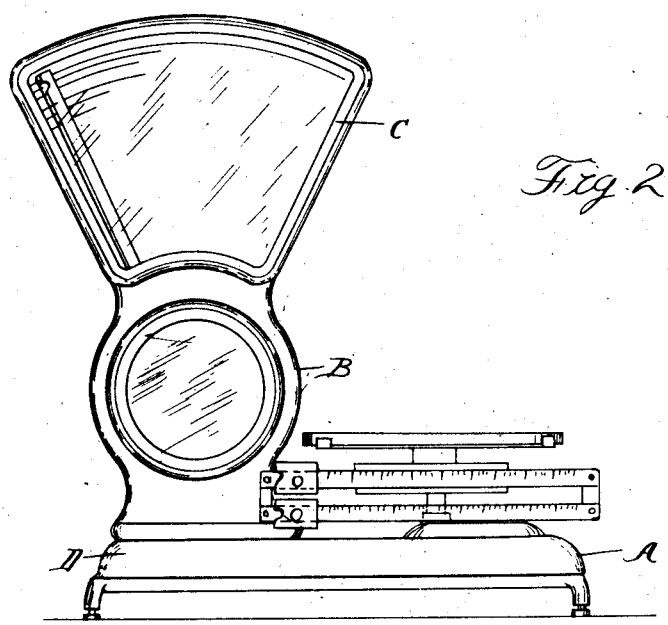
Inventor  
Walter F. Stimpson
Attorneys Patented Aug. 10, 1926.

1,595,321

UNITED STATES PATENT OFFICE.

WALTER F. STIMPSON, OF LOUISVILLE, KENTUCKY.

COUNTER SCALE.

Application filed July 20, 1921, Serial No. 486,118. Renewed January 6, 1926.

The invention relates to counter scales of that type in which the weighing mechanism, such, for instance, as a pendulum weight, and the indicating mechanism, such as a fan-shaped chart, are both arranged in a casing extending upward from the base at one side of the platform or scoop. It is the object of the invention to obtain a more advantageous arrangement of the parts, in which greater clearance is provided for the platform or scoop without materially increasing the base area. To this end the invention consists in the construction as hereinafter set forth.

In the drawings:

Figure 1 is a perspective view of the scale base with the superstructure removed;

Figure 2 is a front elevation of the scale;

Figure 3 is a plan view thereof;

Figure 4 is also a plan view showing a slightly modified construction.

In the type of scales above referred to it is usual to provide a circular or oval base A containing the platform or scoop-supporting levers, said base having a laterally-extending portion above which is mounted a housing B containing the weighing mechanism with an indicating chart C at the upper end thereof. With certain constructions that have heretofore been used, this laterally-extending portion of the base has its rear side tangent to the circular portion of the base so that the housing B is in rear and at one side of the center of the platform. It is necessary, however, that the housing should provide proper clearance from the platform, or from the scoop, where used in place of the platform, and the lateral projection of the base is therefore considerably extended. With my present invention I have obtained a more compact arrangement with a greater clearance from the platform or scoop by offsetting the lateral extension of the base rearward from the tangent plane. The amount of this offsetting is not sufficient to materially increase the dimension from front to rear of the base, but the width of said base including the offset will be considerably reduced. Thus, as indicated in Figure 3, D is the lateral extension of the base, which has its rear edge E offset back of the plane tangent to the circular portion A and this offsets the casing B and chart C a corresponding amount. On the other hand, the lateral projection is reduced from that which would be necessary with the tangent projection to an extent indicated by the dotted lines in Figure 3. This not only produces a more pleasing appearance, but is also more economical of space on the counter, while the clearance for articles on the platform or for the scoop is increased.

As indicated in Figure 4, where the scoop $E^1$ is used, the nose portion F thereof may project laterally in front of the casing B without interference therewith, or, if desired, the nose may be turned to the rear, as indicated in dotted lines, without extending far in rear of the offset portion of the base.

As clearly indicated in Figures 1 and 2, the fulcrum bearings are in a plane perpendicular to the plane of the extension D, which permits of utilizing the greater length of the base and extension for the platform levers and beam. Thus valuable space is saved on the counter over any construction in which the direction of the beam and platform levers is from front to rear.

What I claim as my invention is:

1. In a scale, the combination with the beam or supporting lever and a platform or scoop supported thereon, of a base having a portion located beneath said platform or scoop, and a laterally projecting portion extending in the direction of the extension of the beam and offset a substantial amount to the rear of a plane tangent to the rear edge of said first mentioned portion.

2. In a scale, the combination with a beam or supporting lever and a platform or scoop supported thereon, of a base having a portion for location beneath the platform or scoop, a laterally projecting portion extending in the direction of extension of said beam offset a substantial amount to the rear of a plane tangent to the rear edge of said first mentioned portion, and a chart housing rising from said offset portion and having its upper portion overlapping said first mentioned portion whereby the chart is brought nearer into view over the platform without interference therewith.

3. In a scale, the combination with the beam or supporting lever and a platform or scoop supported thereon, of a base having a circular portion for location beneath the platform or scoop, an elongated portion extending laterally from said circular portion and in the direction of extension of said beam offset a substantial amount to the rear of a plane tangent to said circular portion and a chart housing rising from said elongated portion and having its upper part overlapping said circular portion of the base.

In testimony whereof I affix my signature.

WALTER F. STIMPSON.